US009395799B2

(12) United States Patent
Masson et al.

(10) Patent No.: US 9,395,799 B2
(45) Date of Patent: Jul. 19, 2016

(54) POWER MANAGEMENT TECHNIQUES FOR USB INTERFACES

(75) Inventors: Eric L. Masson, Fremont, CA (US); Matthew R. Longnecker, Sunnyvale, CA (US); Hemalkumar Chandrkant Doshi, Sunnyvale, CA (US); Brian Smith, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 405 days.

(21) Appl. No.: 13/571,299

(22) Filed: Aug. 9, 2012

(65) Prior Publication Data

US 2014/0047257 A1 Feb. 13, 2014

(51) Int. Cl.
*G06F 1/32* (2006.01)

(52) U.S. Cl.
CPC ........... *G06F 1/3253* (2013.01); *Y02B 60/1235* (2013.01)

(58) Field of Classification Search
USPC .......................... 713/300, 320, 340, 198, 322
See application file for complete search history.

(56) References Cited

U.S. PATENT DOCUMENTS

| 5,167,024 | A | * | 11/1992 | Smith et al. ................... 713/322 |
| 5,220,660 | A | | 6/1993 | Yoshizawa et al. |
| 5,379,382 | A | | 1/1995 | Work et al. |
| 5,493,684 | A | | 2/1996 | Gephardt et al. |
| 5,504,910 | A | | 4/1996 | Wisor et al. |
| 5,510,740 | A | | 4/1996 | Farrell et al. |
| 5,511,203 | A | | 4/1996 | Wisor et al. |
| 5,530,845 | A | | 6/1996 | Hiatt et al. |
| 5,586,308 | A | | 12/1996 | Hawkins et al. |
| 5,596,756 | A | | 1/1997 | O'Brien |
| 5,664,205 | A | | 9/1997 | O'Brien et al. |
| 5,758,133 | A | | 5/1998 | Evoy |
| 5,799,196 | A | | 8/1998 | Flannery |
| 5,848,281 | A | | 12/1998 | Smalley et al. |
| 5,862,368 | A | | 1/1999 | Miller et al. |
| 5,864,702 | A | | 1/1999 | Walsh et al. |
| 5,870,621 | A | | 2/1999 | Walsh et al. |
| 5,918,061 | A | | 6/1999 | Nikjou |
| 5,925,133 | A | | 7/1999 | Buxton et al. |

(Continued)

FOREIGN PATENT DOCUMENTS

DE 102011102238 12/2011
GB 2481492 12/2011

OTHER PUBLICATIONS

Tschanz et al., Dynamic Sleep Transistor and Body Bias for Active Leakage Power Control of Microprocessors IEEE SSCS vol. 38, No. 11, Nov. 2003, 1-8.*

(Continued)

*Primary Examiner* — Zahid Choudhury

(57) ABSTRACT

Power management techniques for a Universal Serial Bus (USB) include determining an idle period on one or more USB ports by a main controller circuit of a USB host controller. The main controller circuit signals a suspend to a Power Management Controller (PMC) sub-circuit of the USB host controller, in response to the determined idle period. The PMC sub-circuit stores one or more operating parameters of the one or more USB ports in response to the suspend signal. The PMC sub-circuit also maintains the idle state on the one or more USB ports in response to the suspend signal. Thereafter, the main controller circuit is placed in a low energy state while the PMC sub-circuit maintains the idle state.

13 Claims, 8 Drawing Sheets

(56) References Cited

U.S. PATENT DOCUMENTS

| | | | |
|---|---|---|---|
| 6,044,428 A | 3/2000 | Rayabhari | |
| 6,118,254 A | 9/2000 | Faulk | |
| 6,128,743 A | 10/2000 | Rothenbaum | |
| 6,212,645 B1 | 4/2001 | Tjandrasuwita | |
| 6,397,340 B2 | 5/2002 | Watts, Jr. et al. | |
| 6,467,042 B1* | 10/2002 | Wright et al. | 713/320 |
| 6,510,525 B1 | 1/2003 | Nookala et al. | |
| 6,625,761 B1 | 9/2003 | Sartore et al. | |
| 6,633,932 B1 | 10/2003 | Bork et al. | |
| 6,647,452 B1 | 11/2003 | Sonoda | |
| 6,665,801 B1 | 12/2003 | Weiss | |
| 6,668,296 B1 | 12/2003 | Dougherty et al. | |
| 6,704,824 B1 | 3/2004 | Goodman | |
| 6,728,959 B1 | 4/2004 | Merkey | |
| 6,735,648 B2 | 5/2004 | Onishi | |
| 6,738,213 B2 | 5/2004 | Haitani | |
| 6,754,837 B1 | 6/2004 | Helms | |
| 6,775,776 B1 | 8/2004 | Vogt et al. | |
| 6,795,781 B2 | 9/2004 | Aldridge et al. | |
| 6,804,267 B1 | 10/2004 | Long et al. | |
| 6,816,809 B2 | 11/2004 | Circenis | |
| 6,845,456 B1 | 1/2005 | Menezes et al. | |
| 6,934,788 B2 | 8/2005 | Laity et al. | |
| 6,946,817 B2 | 9/2005 | Fischer et al. | |
| 6,954,814 B1 | 10/2005 | Leach | |
| 6,957,292 B2 | 10/2005 | Croyle | |
| 6,963,933 B2 | 11/2005 | Saito et al. | |
| 6,963,986 B1 | 11/2005 | Briggs et al. | |
| 6,978,362 B2 | 12/2005 | Muth | |
| 6,990,594 B2 | 1/2006 | Kim | |
| 7,024,569 B1 | 4/2006 | Wright et al. | |
| 7,043,649 B2 | 5/2006 | Terrell, II | |
| 7,069,347 B1 | 6/2006 | Kolokowsky | |
| 7,072,989 B1 | 7/2006 | Kolokowsky et al. | |
| 7,100,062 B2 | 8/2006 | Nicholas | |
| 7,170,259 B2 | 1/2007 | Veselic | |
| 7,173,964 B2 | 2/2007 | Hsu | |
| 7,177,969 B2 | 2/2007 | Croyle | |
| 7,271,568 B2 | 9/2007 | Purdy et al. | |
| 7,278,705 B2 | 10/2007 | Ohara | |
| 7,295,827 B2 | 11/2007 | Liu et al. | |
| 7,373,529 B2 | 5/2008 | Nishida et al. | |
| 7,627,730 B1 | 12/2009 | Moll | |
| 7,941,682 B2 | 5/2011 | Adams | |
| 8,055,871 B1 | 11/2011 | Schulze et al. | |
| 8,145,928 B2 | 3/2012 | de Cesare et al. | |
| 8,188,851 B2 | 5/2012 | Haartsen | |
| 8,255,708 B1* | 8/2012 | Zhang | 713/300 |
| 8,433,937 B1* | 4/2013 | Wheelock et al. | 713/320 |
| 8,526,604 B2 | 9/2013 | Batra et al. | |
| 8,656,198 B2 | 2/2014 | Branover et al. | |
| 8,762,759 B2 | 6/2014 | Williams et al. | |
| 8,819,461 B2* | 8/2014 | Sodhi et al. | 713/320 |
| 8,850,252 B2 | 9/2014 | Doshi et al. | |
| 9,104,421 B2 | 8/2015 | Ahmad et al. | |
| 9,104,423 B2 | 8/2015 | Ahmad et al. | |
| 2001/0001879 A1* | 5/2001 | Kubik et al. | 713/320 |
| 2001/0044909 A1 | 11/2001 | Oh et al. | |
| 2002/0078391 A1* | 6/2002 | Yeh | 713/322 |
| 2002/0162035 A1 | 10/2002 | Tsukihashi | |
| 2002/0169915 A1 | 11/2002 | Wu | |
| 2004/0215452 A1 | 10/2004 | Pearah et al. | |
| 2004/0239294 A1 | 12/2004 | Veselic et al. | |
| 2004/0250147 A1 | 12/2004 | Chang | |
| 2005/0033996 A1 | 2/2005 | Fong et al. | |
| 2005/0125705 A1 | 6/2005 | Cheng et al. | |
| 2005/0144495 A1 | 6/2005 | Nakajima et al. | |
| 2005/0267999 A1 | 12/2005 | Suematsu et al. | |
| 2006/0090088 A1 | 4/2006 | Choi et al. | |
| 2006/0218415 A1 | 9/2006 | Mak-Fan et al. | |
| 2006/0261788 A1 | 11/2006 | May | |
| 2006/0287007 A1 | 12/2006 | Veselic et al. | |
| 2007/0005824 A1 | 1/2007 | Howard | |
| 2007/0088967 A1 | 4/2007 | Fu et al. | |
| 2007/0130573 A1 | 6/2007 | Farquhar | |
| 2007/0132427 A1 | 6/2007 | Veselic | |
| 2007/0143505 A1 | 6/2007 | Terrell | |
| 2008/0005446 A1 | 1/2008 | Frantz et al. | |
| 2008/0168285 A1 | 7/2008 | de Cesare et al. | |
| 2008/0263318 A1 | 10/2008 | May et al. | |
| 2009/0111524 A1 | 4/2009 | Basaralu | |
| 2009/0153211 A1* | 6/2009 | Hendin et al. | 327/198 |
| 2009/0204837 A1* | 8/2009 | Raval et al. | 713/330 |
| 2009/0259861 A1 | 10/2009 | Tune | |
| 2010/0067416 A1 | 3/2010 | Gao et al. | |
| 2010/0067421 A1 | 3/2010 | Gorokhov et al. | |
| 2010/0250972 A1 | 9/2010 | Freitas | |
| 2011/0161711 A1 | 6/2011 | Takamoto | |
| 2011/0320839 A1 | 12/2011 | David et al. | |
| 2012/0084592 A1 | 4/2012 | Lin et al. | |
| 2012/0167118 A1 | 6/2012 | Pingili et al. | |
| 2012/0284537 A1 | 11/2012 | Kruglick | |
| 2013/0111242 A1 | 5/2013 | Heller et al. | |
| 2013/0179612 A1 | 7/2013 | Feekes | |
| 2013/0198540 A1 | 8/2013 | Lee et al. | |
| 2013/0290760 A1 | 10/2013 | Cooper et al. | |

OTHER PUBLICATIONS

"Intel.Rtm. I/O Controller Hub 1 0 (ICH1 0) Family". Oct. 2008. Intel Corporation. Document No. 319973-003.

"Universal Host Controller Interface (UNCI) Design Guide". Revision 1.1. Mar. 1996. Intel Corporation.

"Low Power Function of Mobile Ram Partial Array Self Refresh (PASR)". Version 1.0. Nov. 2005. Elpida Memory, Inc. Document No. E0697E1 O.

Stern, Alan. "USB device peristence during system suspend". Online Feb. 25, 2008. Retrieved from Internet Dec. 3, 2013. <http://www.cs.fsu.edu/-baker/devices/lxr/http/source/linuxIDocumentation/usb/persist.txt>.

"Universal Serial Bus Specification". Revision 2.0. Apr. 27, 2000. Compaq Computer Corporation et al.

Power Management of US Host Controllers, Microsoft Corporation, Aug. 30, 2004, p. 8.

* cited by examiner

POWER MANAGEMENT TECHNIQUES FOR USB INTERFACES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing devices is the communication protocol, connectors and cables for communicating within the computing device, between the computing device and internal or external peripheral devices, and the like. The Universal Serial Bus was developed to standardize communication between a host computing device and one or more attached USB devices. The USB standard provides for both communication and the supply of power between the host computing device and the one or more USB devices. The one or more USB devices are coupled to the host computing device in a tiered-star topology. USB devices are linked in series through hubs. The host computing device implements the root hub. USB devices communicate using logical channels (e.g., pipes). A pipe is a connection from the host controller to a function of the USB device.

When a USB device is first connected to a USB host, a USB device enumeration process is started. The enumeration starts by sending, a reset signal to the USB device. The data rate of the USB device is determined during the reset signaling. After the reset, the USB device's information, including its class code that specifies the device's functionality, is read by the host and the device is assigned a unique address. If the device is supported by the host, the device drivers needed for communicating with the USB device are loaded and the device is set to a configured state. If the USB host is restarted, the enumeration process is repeated for all connected USB device. The enumeration process is relatively time consuming. Accordingly, there is a continued need for improved techniques for waking-up a USB port from deep sleep where the host USB controller is powered down.

SUMMARY OF THE INVENTION

The present technology may best be understood by referring to the following description and accompanying drawings that are used to illustrate embodiments of the present technology directed toward techniques for USB interface power management.

In one embodiment, a method of suspending communication on one or more USB ports includes determining, by a main controller circuit of a USB host controller, an idle period on the one or more USB ports. In response to the determined idle period, the main controller circuit signals a suspend to a Power Management Controller (PMC) sub-circuit of the USB host controller. The PMC sub-circuit stores one or more operating parameters of the one or more USB ports in response to the suspend signal. The PMC sub-circuit also maintains the idle state on the one or more USB ports in response to the suspend signal. Thereafter, the main controller circuit is placed in a low energy state while the PMC sub-circuit maintains the idle state.

In another embodiment, a method of resuming communication on one or more USB ports includes initiating or detecting, by the PMC sub-circuit, a wakeup event on a USB port. In response to the wakeup event, the PMC sub-circuit retrieves one or more operating parameters of the USB port. The PMC sub-circuit also wakes up the main controller circuit of the USB host controller, in response to the wakeup event. While the main controller circuit is waking up, the PMC sub-circuit produces a predetermined sequence of events on the USB port. Thereafter, the main controller circuit may resume communication on the USB port after the predetermined sequence of events produced by the PMC sub-circuit.

In yet another embodiment, a USB host controller includes a main controller circuit and a PMC sub-circuit. The main controller circuit is adapted to determine an idle state on one or more USB ports and signal a suspend. The PMC sub-circuit, in response to the suspend, is adapted to store one or more operating parameters of the one or more USB ports, to maintain the idle state on the one or more USB ports, and to place the main controller circuit in a low energy state while, maintaining the idle state on the one or more USB ports, wherein the PMC controller is in an always on domain of the USB host controller. The PMC sub-circuit is further adapted to initiate or detect a wakeup event on one of the one or more USB ports, to retrieve the one or more operating parameters of the one or more USB ports in response to the wakeup event, to wakeup the main controller circuit in response to the wakeup event, to produce a predetermined sequence of events based on the one or more operating parameters on the one or more USB ports while the main controller circuit is waking up. The main controller circuit is further adapted to resume communication on the one of the one or more USB ports after the predetermined sequence of events produced by the PMC sub-circuit.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1A:
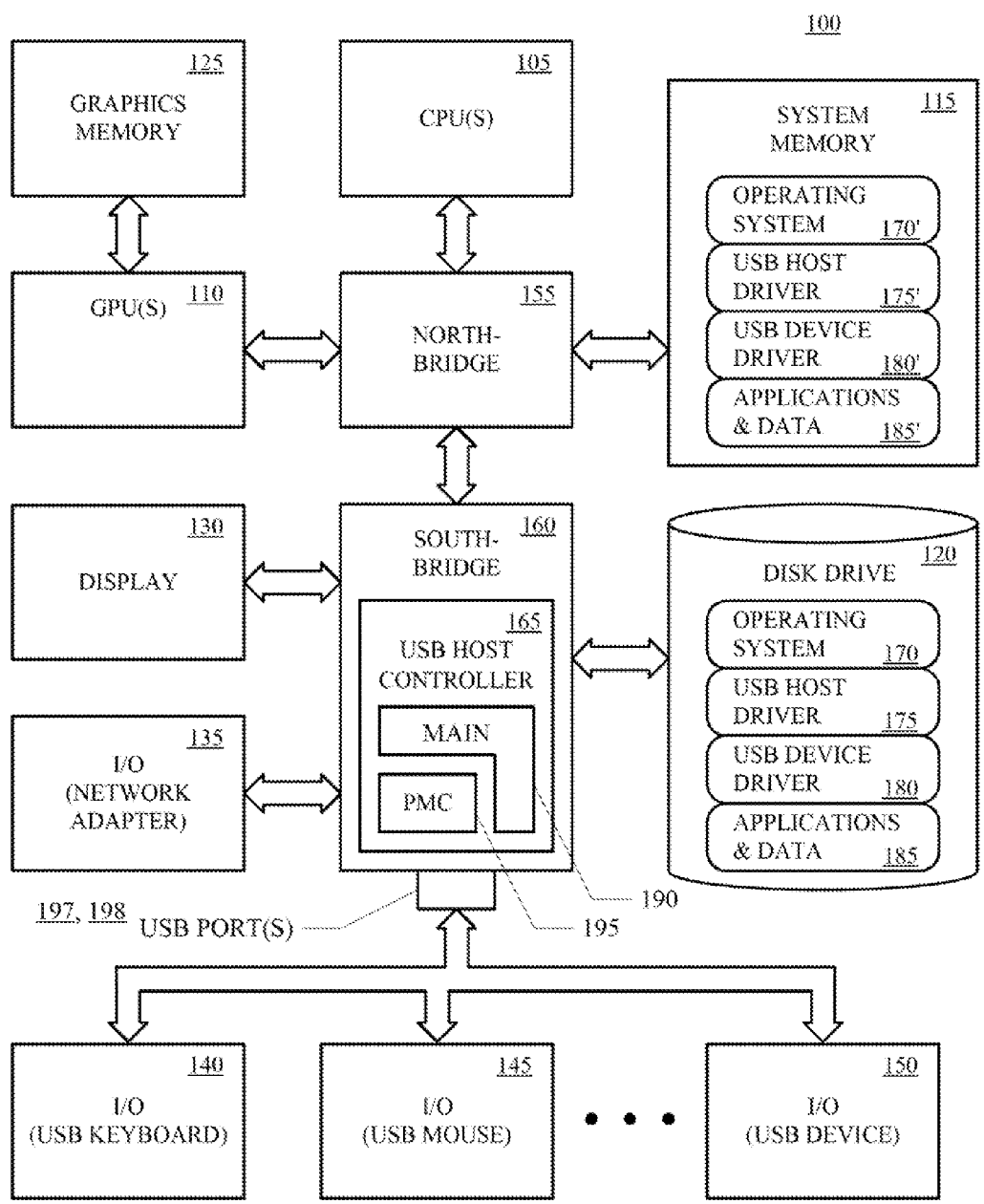
FIG. 1A shows a block diagram of an exemplary computing device for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic, block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device, that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1A, an exemplary computing device 100 for implementing embodiments of the present technology is shown. The computing device 100 may be a laptop personal computer, a tablet personal computer, a netbook, a smart phone, or the like mobile computing device. The computing device 100 includes one or more processors 105, 110, one or more computing device-readable media 115, 120, 125, one or more input/output (I/O) devices 130, 135, 140, 145, 150 and one or more input, output hubs 155, 160 communicatively coupled together by one or more communication buses. The processors 105, 110 may include one or more general purpose processors, such as a central processing unit (CPU) 105, and one or more specialized processors, such as a graphics processing unit (GPU) 110. The I/O devices 130, 135, 140, 145, 150 may include, a display 130, a network adapter (e.g., Ethernet card) 135, CD drive, DVD drive and/or the like, and peripherals such as a keyboard 140, a pointing device 145, a speaker, a printer, and/or the like. In one implementation, the one or more input/output hubs 155, 160 include a chipset, such as a northbridge 155 and southbridge 160. The northbridge 155 provides for communication with the processor 105 and interaction with the system memory 115. The southbridge 160 provides for input/output functions. One common input/output function provided for by the southbridge 160 is a USB host controller 165. It is appreciated that the exemplary computing device 100 in FIG. 1A may include one or more addition sub-systems, may not include one or more described sub-systems, and/or one or more sub-systems may be combined or further divided into separate subsystems. For example, the north-bridge 155 and the central processing unit 105 may be implemented in a single integral sub-system. Similarly, the north-bridge 155 may be implemented integral to the graphics processing unit 110.

Figure 1B:
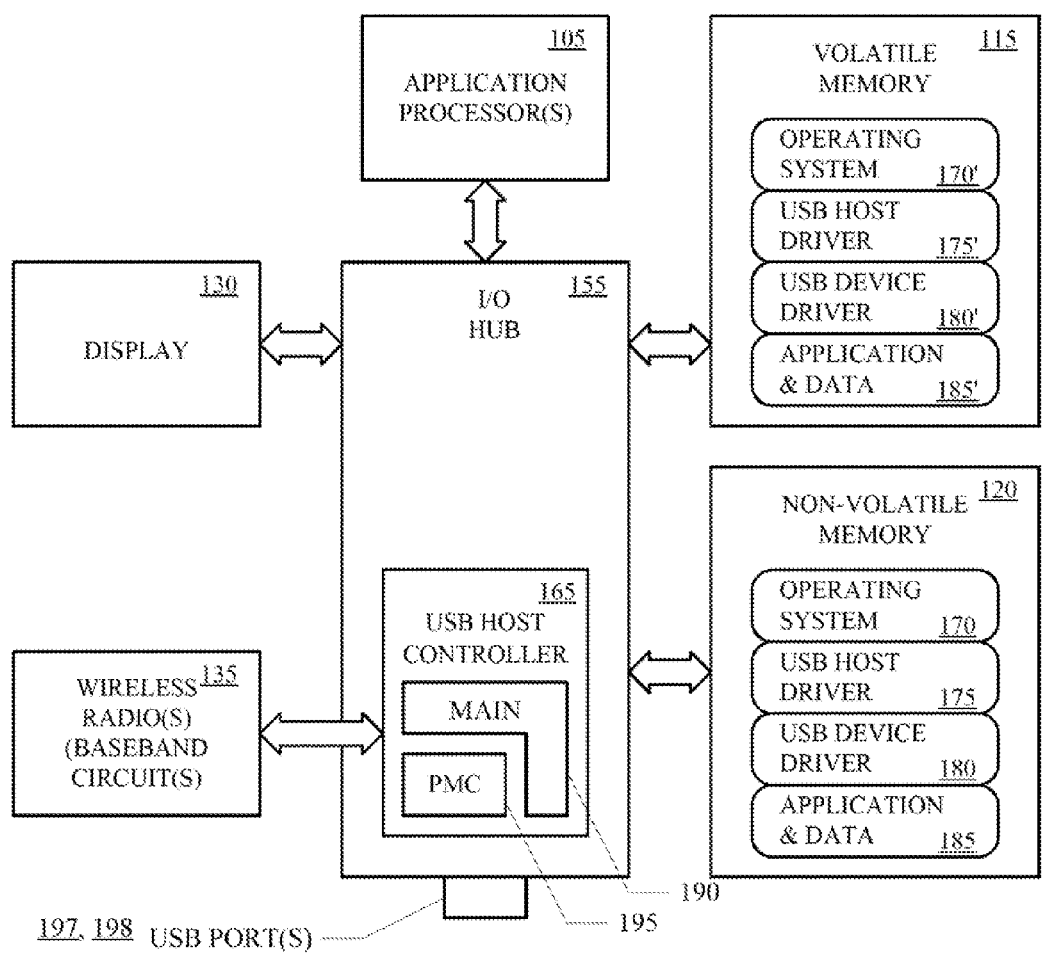
FIG. 1B shows a block diagram of another exemplary computing device for implementing embodiments of the present technology.

Referring now to FIG. 1B, another exemplary computing device 100 for implementing embodiments of the present technology is shown. The computing device 100 includes one or more processors 105, one or more computing device-readable media 115, 120 one or more input/output (I/O) devices 130, 135 and one or more input/output hubs 155 communicatively coupled together by one or more communication buses. The processors may include an application processor 105. The I/O devices 130, 135 may include a display 130, a wireless radio (e.g., baseband circuit) 135, and/or the like. The input/output hub 155 includes a USB host controller 165. Again, the exemplary computing device 100 in FIG. 1B may include one or more additional sub-systems, may not include, one or more described sub-systems, and/or one or more sub-systems may be combined or further divided into separate subsystems.

Referring now to FIGS. 1A and 1B, the computing device-readable media 115, 120, 125 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 170, one or more utilities and software drivers 175, 180, and various applications and data 185. The utilities and software drivers typically include a USB host driver 175 and one or more USB device drivers 180 fir attached USB devices, such as a keyboard 140 and mouse 145. The primary memory, such as the system memory 115 and/or graphics memory 125, provides for volatile storage of computer-readable instructions and data for use by the computing device 100. For instance, the system memory 115 may temporarily store a portion of the operating system 170, portions of one or more utilities and software drivers 175', 180', and a portion of one or more applications and associated data 185' that are currently used by the CPU 105, GPU 110 and the like. It is also appreciated that one or more elements of the computing, device, such as the I/O hub 155, 160, may further include specialized computing, device-readable media such as non-volatile flash memory and/or read only memory (ROM), and/or volatile random access memory. It is further appreciated that the USB controller 165 often also encompasses a regular USB PHY (2.0).

The USB host driver 175 USB host controller 165 and USB device drivers 180 operate in accordance with the well-known in the art Universal Serial Bus Specification standard. The well-known conventional aspects of the USB host driver 175 USB host controller 165 and USB device drivers 180 will not be further explained herein except as they related to the USB power management techniques, in accordance with embodiments of the present technology, described below.

The USB host controller 165 includes a main controller circuit 190 and a power management controller (PMC) sub-circuit 195. The PMC sub-circuit 195 is located in an always-on power domain of the USB host controller 165. The main controller circuit 190 is located in a power-gated domain of the USB host controller 165, wherein one or more supply potentials, power to one or more clocks, and/or transistor body bias potentials of the main controller circuit 190 may be selectively controlled. The PMC sub-circuit 195 provides for the operating behavior of the USB host controller 165 when the main controller circuit is in a low energy state. The PMC sub-circuit 195 allows most of the main controller circuit 190 to be completely turned off during prolonged interface rest periods. The PMC sub-circuit 195 allows the USB host ports 197 to maintain a known good state for USB connected devices 140-150 to remain connected to the USB interface. The PMC sub-circuit 195 is also capable of quickly responding to requests to resume operation of the USB interface. In response to a request to resume operation, the PMC sub-circuit 195 produces a predetermined sequence of events on the USB data buss (D−, D+, also referred to as DM, DP, or pin 2 and pin 3 for regular USB, and strobe and data for High Speed Inter-Chip (HSIC)), to give sufficient time for the PMC sub-circuit 195 to wake-up the main controller circuit 190 and resume more complex operations. Accordingly, the term sleepwalking is attributed to the technique because the PMC sub-circuit 195 is capable of maintaining an interface configured and responsive to associated protocol behavior while the main controller circuit 190 is powered down.

Figure 2:
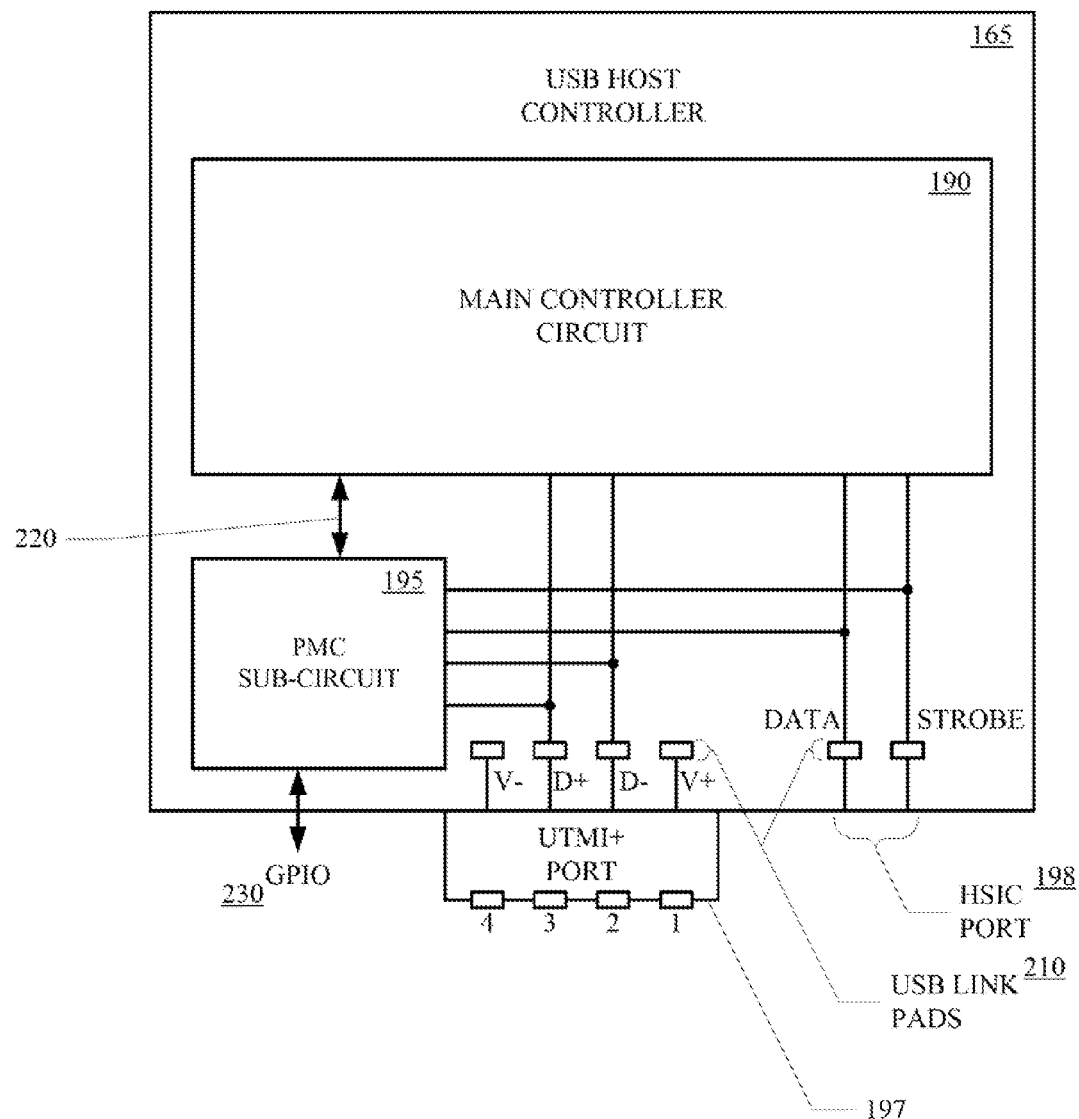
FIG. 2 shows a block diagram of a USB host controller, in accordance with one embodiment of the present technology.

Referring now to FIG. 2, a USB host controller, in accordance with one embodiment of the present technology, is shown. The USB host controller 165 includes a main controller circuit 190, as PMC sub-circuit 195 and one or more USB host ports 197, 198. In one implementation, the USB host controller includes three Transceiver Macro Cell Interface (UTMI+) ports (UTMIP_P0, UTMIP_P1, UTMIP_P2) 197 and a High Speed Inter-Chip (HSIC) port (HSCI_P0) 198. The main controller circuit 190 operates in accordance with the well-known in the art Universal Serial Bus Specification standard to provide for communication across the communication link of each host port 197, 198. During standard operating, states, the main controller circuit controls the signaling at the USB link pads 210 to provide for communication according to the USB protocol standard. The operation of the USB host controller, during low energy states in accordance with embodiments of the present technology, will be further explained with reference to FIGS. 3 and 4.

Figure 3:
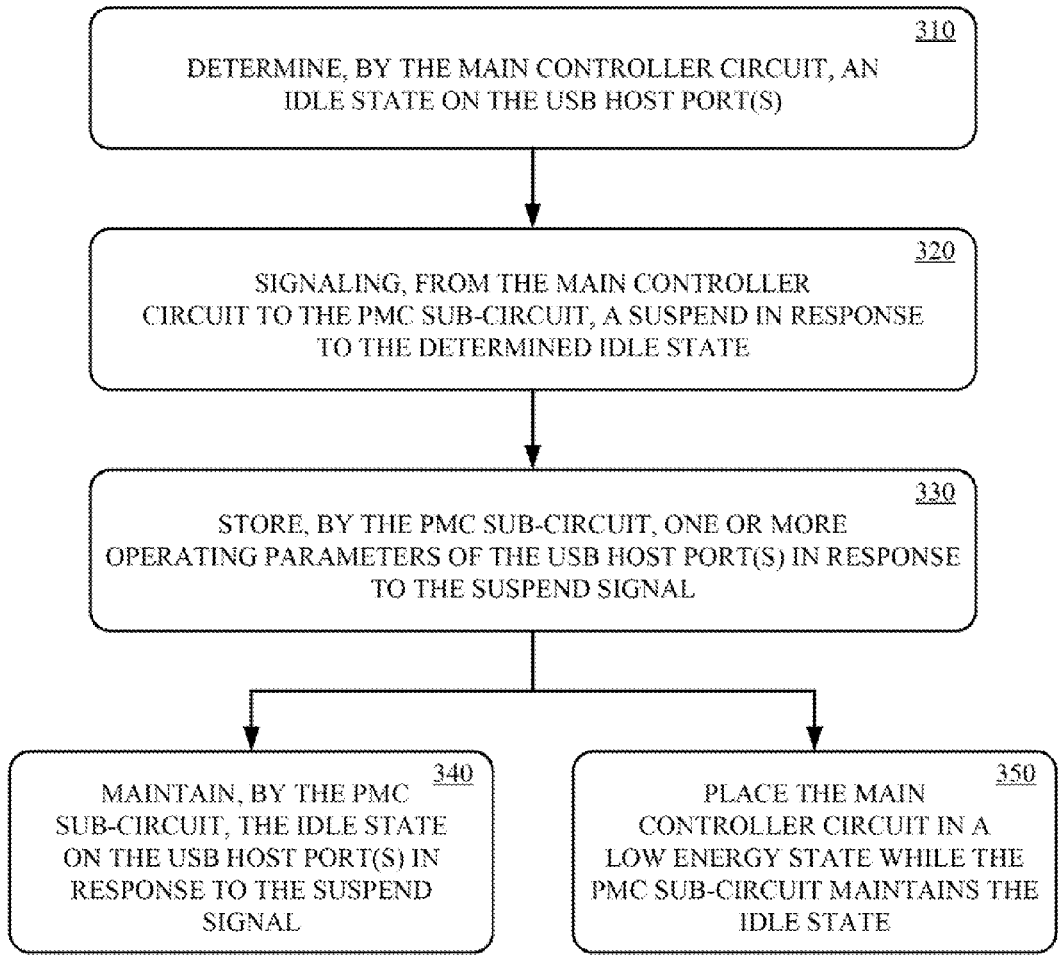
FIG. 3 shows a flow diagram of a method of suspending a USB communication link, in accordance with one embodiment of the present technology.

Referring now to FIG. 3, a method of suspending a USB communication link, in accordance with one embodiment of the present technology, is shown. The method begins with the main controller circuit 190 determining an idle period where there is no communication on each of the one or more USB host ports 197, 198, at 310. The techniques also support other forms of idle such as connect events, disconnect events, VBUS (5V power signal) detecting, USB OTG (on-the-go) ID bit, and/or the like.

During an idle period where there is no communication, the USB ports 197, 198 will be in a J state. For example, on a UTMI+ port the main controller circuit 190 provides a weak pull-down on both Data (D−, D+) USB link pads 210 through approximately 15K Ohms during idle periods. The attached USB devices operating at full speed provide a pull-up through approximately 1.5K Ohms on the D+ data line to signal the J (e.g., idle) state. For a full speed port or a high speed port, the idle period 505 is illustrated by the timing diagram in FIG. 5A. USB devices operating at low speed provide a pull up through approximately 1.5K Ohms on the D− line to signal the J state. For a low speed port, the idle period 510 is illustrated by the timing diagram in FIG. 5B. For as HSIC port, the main controller circuit 190 provides a pull-up through approximately 1.3K Ohms on the Strobe (Clock) USB link pad and a pull down through approximately 2.6K Ohms on the Data USB link pad. For the HSIC port, the idle period 515 is illustrated by the timing diagram in FIG. 5C.

At 320, the main controller circuit 190 signals 220 a suspend to the PMC sub-circuit 195 in response to determining an idle period where there is no communication on the USB host ports. When signaling a suspend, the controller context will be saved. The controller context may be saved in accordance with the techniques disclosed in co-pending U.S. patent application Ser. No. 13/288,355, filed Nov. 3, 2011, entitled "USB Host Wake from Sleep State for Mobile Devices" by Hemal Doshi et al., which is incorporated herein by reference.

At 330, the PMC sub-circuit 195 stores one or more operating parameters of the one or more USB host ports 197, 198 in response to the suspend signal. In one implementation, the operating speed of each of the one or more UTMI+ ports is stored in a register within the PMC sub-circuit 195.

Figure 5A:
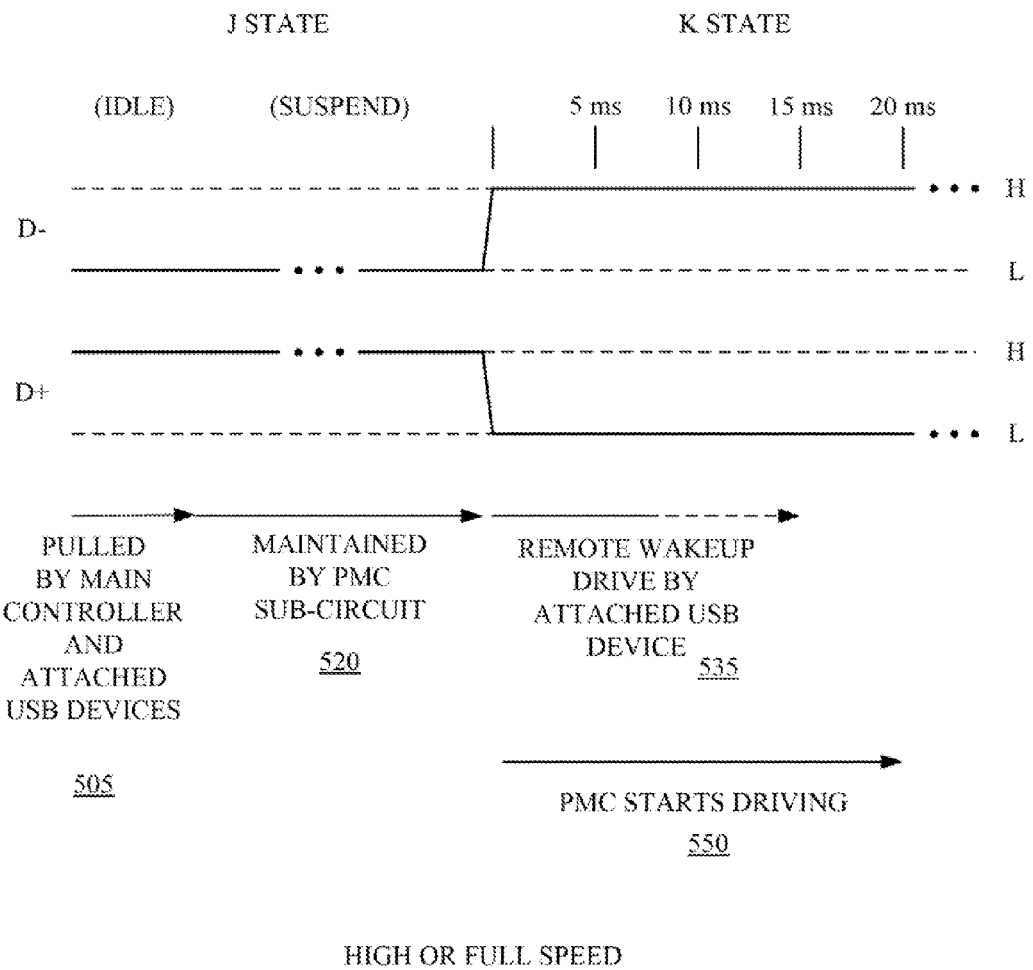
FIGS. 5A, 5B and 5C show timing diagrams illustrating signaling on full speed, low speed and high speed, in accordance with embodiments of the present technology.
Figure 5B:
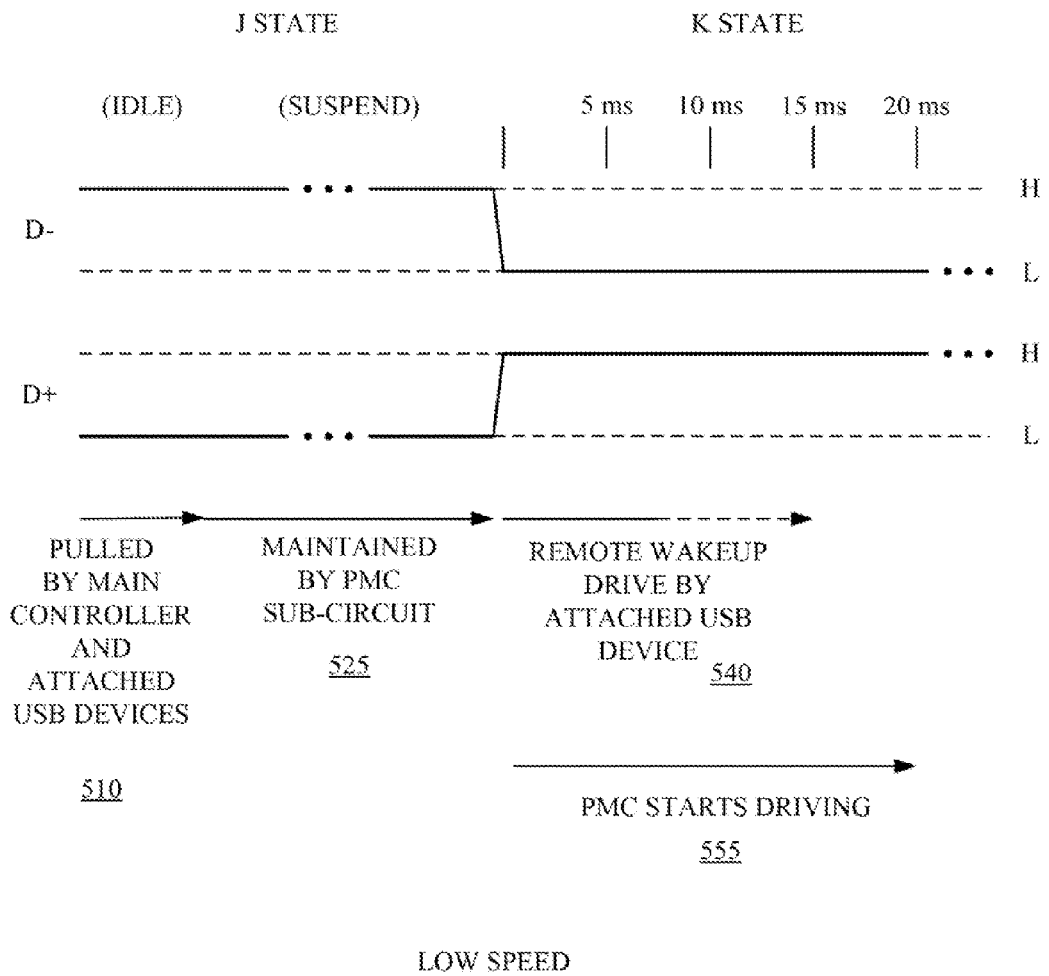
Figure 5C:
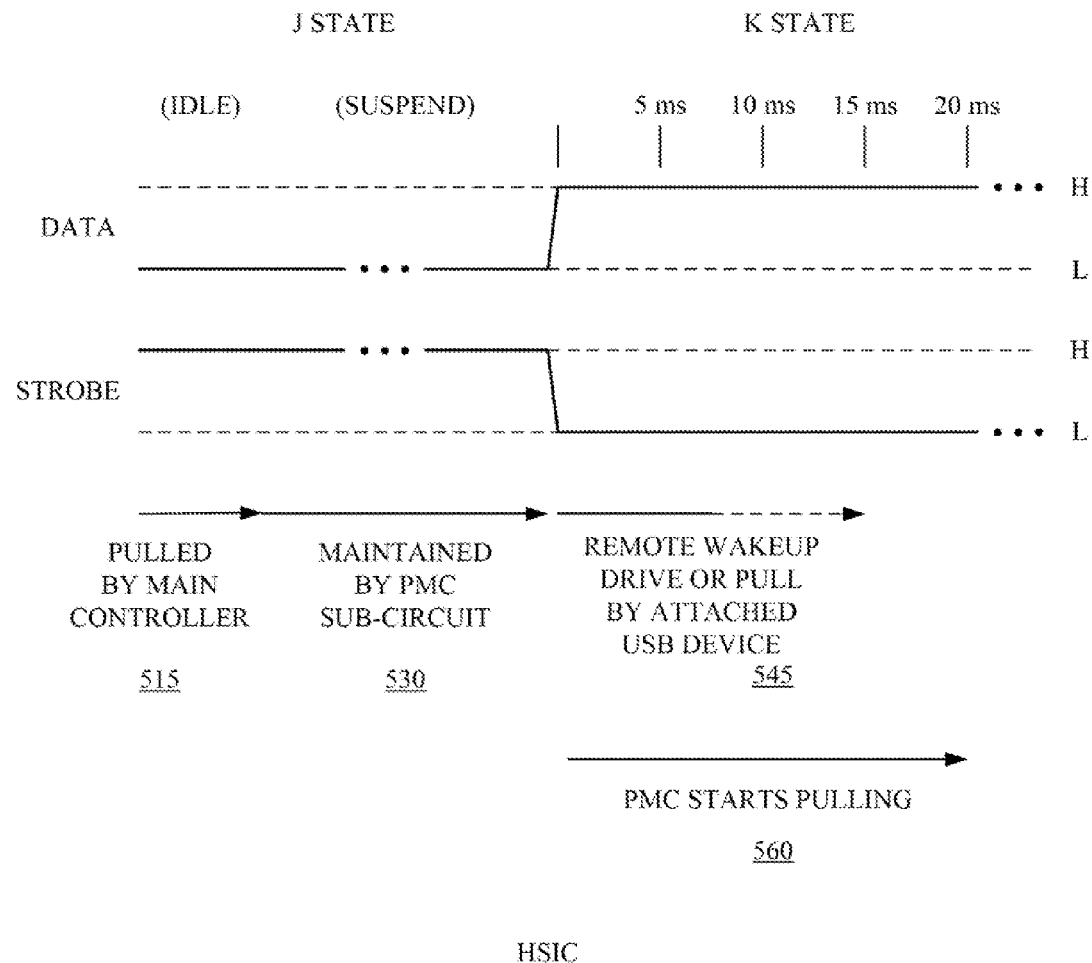

In response to the suspend signal, the PMC sub-circuit 195, which is in an always-on power domain, maintains the J (e.g., idle) state on the USB link pads 210 of the USB ports 197, 198, at 340. For example, on a UTMI+ port the PMC sub-circuit 195 maintains a weak pull-down on both Data (D−, D+) USB link pads 210 through approximately 15K Ohms during idle periods. For a full speed port or high speed port, the maintained J state 520 is illustrated in FIG. 5A. For a low speed port, the maintained J state 525 is illustrated in FIG. 5B. For a HSIC port, the PMC sub-circuit 195 maintains a pull-up through approximately 1.3K Ohms on the Strobe (Clock) USB link pad and a pull down through approximately 2.6K Ohms on the Data USB link pad, as illustrated in FIG. 5C. For connect or disconnect, the PMC sub-circuit 195 places pull downs on both Data (D−, D+) USR link pads 210 (e.g., SE0).

For a UTMI+ port, as described above, a weak pull-down through approximately 15K Ohms may be applied on both Data (D−, D+) USB link pads 210 during idle periods. The USB attached device typically has a 1.5K ohms pull up on D+ for full speed or D− for low speed. At 3.3V this, however, draws 2 mA while idling. Therefore, in another implementation, a larger pull down value, such as 163.5K ohms, may be applied on the line shared with the pull up applied by the USB attached device. In such an implementation, the current drawn from the pull up is substantially reduced, for example to 200 µA. The other line can independently retain the standard 15K ohm value on the pull down, or use the larger termination impedance.

At 350, the main controller circuit 190 is placed in a low energy state while the PMC sub-circuit 195 maintains the (e.g., idle) state on the USB link pads of the USB ports 197, 198. The power management control (PMC) sub-circuit may place one or more nodes of the main controller circuit 190 in a low energy state. In one implementation, the PMC sub-circuit may put one or more pads or phase lock loops (PLLs) in a low power mode even in the presence of a power supply. The main controller 190 circuit may also be placed in a low energy state by turning off one or more supply potentials, turning off one or more clocks (e.g., oscillator, phase lock loop (PLL)), changing one or more transistor body bias potentials, and/or the like. In one implementation, a power management unit (PMU), system software and/or the like may control directly or indirectly a power supply circuit, a dock circuit and/or body bias circuit to turn off or gate the one or more supply potential, to turn off power to one or more clocks, and/or to change the one or more transistor body biasing potentials in the main controller circuit 190. The PMU sub-circuit may be external to the USB host controller 165. The PMU sub-circuit may act in response to one or more signals received from the USB host controller 165 and/or PMC 195.

During the processes of 330 and 340, the USB host ports are considered to be in a suspend state because the idle state normally maintained by the main controller circuit 190 is instead maintained by the PMC sub-circuit 195. Accordingly, the term suspend state as used herein refers to when the PMC sub-circuit 195 is maintaining the J (e.g., idle) state at the USB link pads 210 of the USB ports 197, 198. Optionally, the main controller circuit may also be powered down.

Figure 4:
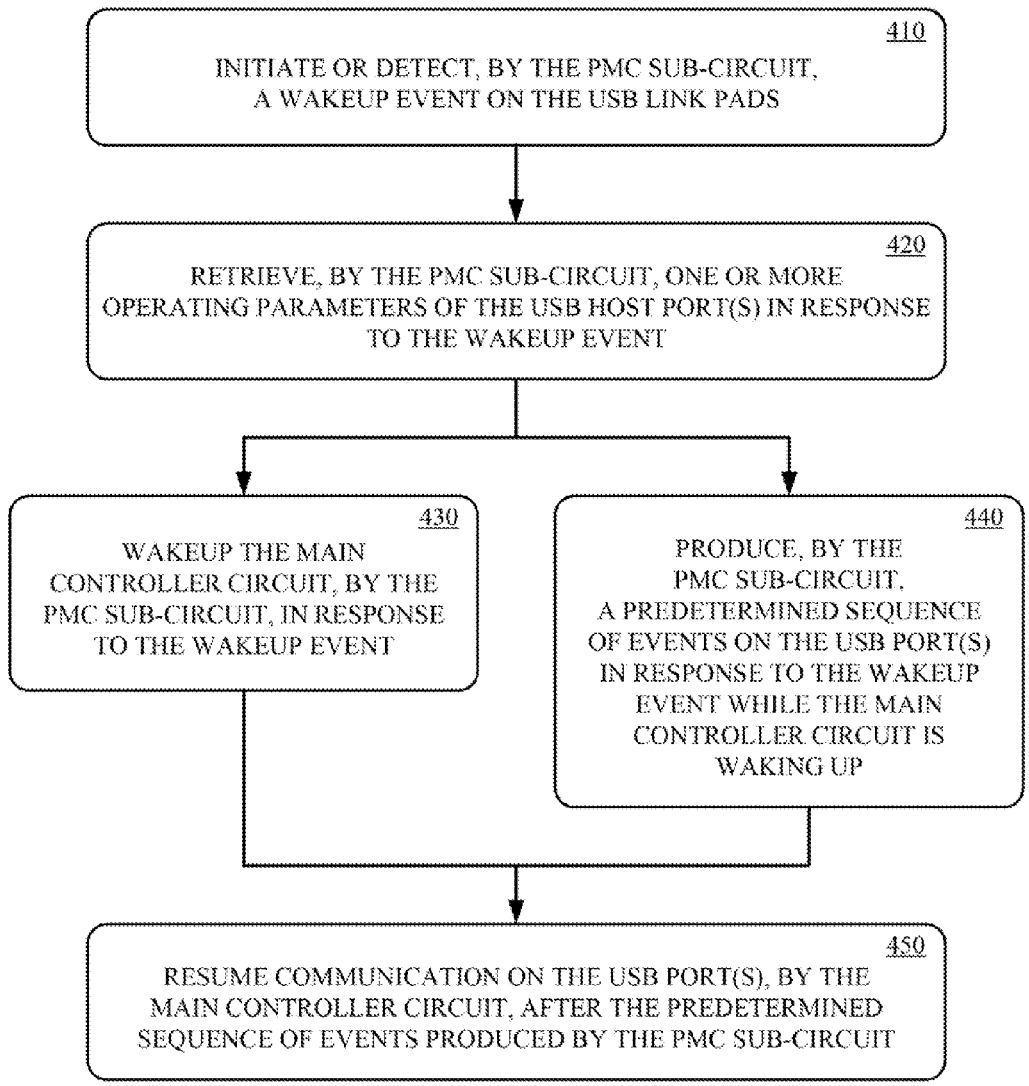
FIG. 4 shows a flow diagram of a method of waking up from suspend on a USB communication link, in accordance with one embodiment of the present technology.

Referring now to FIG. 4, a method of sleepwalking to wakeup from suspend on a USB communication link, in accordance with one embodiment of the present technology, is shown. The method begins with initiating or detecting, by the PMC sub-circuit 195, a wakeup event, at 410. The wakeup event may come from any source including a general purpose input/output 320 or a USB port 197, 198 itself. The wakeup event may be detected when a USB connected device drives a USB port to the K state for a predetermined period of time, which is referred to herein as a remote wakeup. The wakeup event may be initiated when the PMC sub-circuit 195 drives a USB port 197, 198 to the K state for a predetermined period of time in response to signaling received from another source on a general purpose input/output 320 or the like, which is referred to herein as a resume. The minimum and/or maximum length of the predetermined period of time is based upon whether the wakeup event is a remote wakeup or a resume. For a connect event, the PMC sub-circuit 195 may detect a change from SE0 (e.g., D+=0, D−=0) to any other value. For example, a detected change may be from a strong pull up on the D+ line for full speed or high speed, or a strong pull up on the D− line for low speed devices. For a disconnect event, the PMC sub-circuit 195 may detect a change from J to any other value.

During a remote wakeup, for example, a full speed UTMI+ class USB connected device drives the D− link pad high (e.g., 3.3V) and the D+ link pad low (e.g., 0V) for at least 1 milliseconds (ms) and at most 15 ms. For a full speed port or a high speed port, the remote wakeup event 535 is illustrated in FIG. 5A. For a low speed UTMI+ class device, the D− link pad is driven low and the D+ link pad is driven high for at least 1 ms and at most 15 ms. For a low speed port, the remote wakeup event 540 is illustrated in FIG. 5B. For a HSIC class USB connected device, the Strobe link pad is driven low and the Data link pad is driven high for at least 1 ms and at most 15 ms. Alternatively, the Strobe link pad may be pulled low and the Data link pad may be pulled high to eliminate the need for corresponding drivers. For a HSIC port, the remote wakeup event 545 is illustrated in FIG. 5C.

During a resume, for example, the PMC sub-circuit 195 starts driving the D− link pad high and the D+ link pad low, for a UTMI+ port configured to operate at high or full speed prior to suspend. For a low speed configured UTMI+ port, the PMC sub-circuit 195 starts driving the D− link pad low and the D+ link pad high. For a HSIC port, the PMC sub-circuit 195 starts pulls the Strobe link pad low and the Data link pad high.

At 420, the PMC sub-circuit 195 retrieves one or more operation parameters of the USB host ports. In one implementation, the operating speed of each of the one or more UTMI+ ports is retrieved from a register with tin the PMC sub-circuit 195.

At 430, the PMC sub-circuit 195 wakes up the main controller circuit 190 in response to initiating a wakeup event on a USB port or detecting a wakeup event on a USB port. The PMC sub-circuit 195 may remove one or more nodes of the main controller circuit 190 from the low energy state. The main controller circuit 190 may also be woken up by turning on one or more clocks. The main controller circuit 190 may further be woken up by turning one or more supply potentials, changing one or more transistor body bias potentials, and/or the like if applicable. In one implementation, the PMU sub-circuit, system software and/or the like may turn on one or more supply potentials, clocks, spin up one or more phase lock loops (PLL), change one more transistor body bias potentials in response to one or more control signals from the PMC 195. Additionally, the PMC sub-circuit 195 may also wake up some or all of the associated system-on-a-chip (SOC) or chip along with the USB controller.

At 440, the PMC sub-circuit 195 produces, while the main controller circuit 190 is waking up, a predetermined sequence of events on one or more USB port in response to initiating a wakeup event or detecting a wakeup event. The predetermined sequence of events for each port is based upon the speed of the port. The predetermined sequence of events produced by the PMC sub-circuit 195 provides sufficient time for the main controller circuit 190 to be reinitialized.

During a remote wakeup, for example, the PMC sub-circuit 195 takes over driving the D− link pad high and the D+ link pad low within 0.5 ms and continues the drive for at least 20 ms, for a UTMI+ port configured to operate at full or high speed prior to suspend. For a full or high speed port, the continued drive 550 is illustrated in FIG. 5A. For a low speed UTMI+ port, the PMC sub-circuit 195 takes over driving the D− link pad low and the D+ link pad high within 0.5 ms and continues the drive for at least 20 ms. For a low speed port, the continued drive 555 is illustrated in FIG. 5B. For a HSIC port, the PMC sub-circuit 195 takes over pulling the Strobe link pad low and the Data link pad high within 0.5 ms and continues the pull for at least 20 ms. For a HSIC port, the continued pull 560 is illustrated in FIG. 5C.

During a resume, for example, the PMC sub-circuit 195 continues to drive the D− link pad high and the D+ link pad low for at least 20 ms, for a UTMI+ port configured to operate at high or full speed prior to suspend. For a low speed configured UTMI+ port, the PMC sub-circuit 195 continues to drive the D− link pad low and the D+ link pad high for at least 20 ms. For a HSIC port, the PMC sub-circuit 195 continues to pull the Strobe link pad low and the Data link pad high for at least 20 ms.

During a connect, the PMC sub-circuit 195 may simply maintain the pull down until the main controller circuit 195 wakes up. During a disconnect event, the PMC sub-circuit 195 would still drive the K state until the main controller circuit 190 is fully restored.

Accordingly, the predetermined sequence of events signaled by PMC sub-circuit 195 continues to drive the K state on the USB link pads, started by the wakeup event to provide sufficient time to reinitialize the main controller circuit 190. The predetermined sequence of events may include further optional signaling to further provide sufficient time to reinitialize the main controller circuit 190 and restoring as controller context in accordance with the techniques disclosed in co-pending U.S. patent application Ser. No. 13/288,355, filed Nov. 3, 2011, entitled "USB Host Wake from Sleep State for Mobile Devices" by Hemal Doshi et al., which is incorporated herein by reference.

At 450, communication on the one or more USB links is resumed by the main controller circuit 190 after the predetermined sequence of events produced by the PMC sub-circuit 195. The communication is resumed without re-enumeration of the communication link. In the case of a disconnect, the main controller circuit 190 may then determine if a disconnect event occurred or if a resume (e.g. K state) was driven. It costs less hardware in the PMC sub-circuit 195 to not behave conditionally on the transition from J to K (e.g., resume) or J to SE0 (e.g., disconnect). Alternatively, it is possible to add conditional hardware in order to simplify software handling.

Although embodiments of the pre em technology have been described with reference to the USB host, it is also appreciated that embodiments of the present technology can be implemented in the USB devices. When implementing on the USB device side, the devices should be capable of waking from full sleep within 15 ms to respond to the USB host.

Accordingly, embodiments of the present technology provide the ability to quickly react during rest periods to advantageously allow the interface to resume communication. The rapid response during rest makes the choice of operating the low power PMC sub-circuit a decision that is independent of the external circuitry connected to the interface. The techniques may be generic to any device connection and does not place restriction on the frequency of usage of the low power solution. The techniques are applicable to many contexts, and in particular to mobile computing devices where low power dissipation is important. A typical use case could be found in the context of phone calls being signaled on the USB interface between a baseband circuit and an application processor of a smart phone. The smart phone often spends most of its time at rest, but the application processor and USB interface are often required to be available as quickly as possible when exiting from rest. In addition, the above described techniques may be used to support interrupts, polling and/or the like. Waking up the controller for support of interrupts provides a highly energy efficient mechanism for handling interrupts.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   determining, by a main controller circuit of a Universal Serial Bus (USB) host controller, an idle period on one or more USB ports of the USB host controller;
   signaling, from the main controller circuit to a Power Management Controller (PMC) sub-circuit of the USB host controller, a suspend in response to the determined idle period;
   storing, by the PMC sub-circuit, one or more operating parameters of the one or more USB ports in response to the suspend signal;
   maintaining, by the PMC sub-circuit, the idle state on the one or more USB ports in response to the suspend signal;
   placing the main controller circuit in a low energy state while the PMC sub-circuit maintains the idle state;
   initiating or detecting, by the PMC sub-circuit, a wakeup event on at least one of the one or more USB ports;
   retrieving, by the PMC sub-circuit, the one or more operating parameters of the one or more USB ports in response to the wakeup event;
   waking up the main controller circuit, by the PMC sub-circuit, in response to the wakeup event;
   producing by the PMC sub-circuit, a predetermined sequence of events on the at least one of the one or more USB ports in response to the wakeup event while the main controller circuit is waking up; and
   resuming communication on the at least one of the one or more USB ports, by the main controller circuit, after the predetermined sequence of events produced by the PMC sub-circuit.

2. The method of claim 1, wherein the PMC sub-circuit is in an always on domain of the USB host controller.

3. The method of claim 1, wherein placing the main controller circuit in a low energy state comprises gating or turning off one or more clocks of the main controller circuit.

4. The method of claim 3, wherein placing the main controller circuit in a low energy state further comprises gating or turning off one or more supply potentials of the main controller circuit.

5. The method of claim 3, wherein placing the main controller circuit in a low energy state further comprises switching one or more transistor body bias potentials of the main controller circuit from a first set of potentials to a second set of potentials.

6. The method of claim 1, wherein waking up the main controller circuit comprises turning, on one or more clocks of the main controller circuit.

7. The method of claim 6, wherein waking up the main controller circuit further comprises turning on one or more supply potentials of the main controller circuit.

8. The method of claim 6, wherein waking up the main controller circuit further comprises switching the one or more transistor body bias potentials of the main controller circuit from a second set of potentials to a first set of potentials.

9. An Universal Serial Bus (USB) host controller comprising:
   a main controller circuit to determine an idle state on one or more USB ports of the USB host controller and signal a suspend;
   a Power Management Controller (PMC) sub-circuit, in response to the suspend, to store one or more operating, parameters of the one or more USB ports, to maintain the idle state on the one or more USB ports, and to place the main controller circuit in a low energy state while maintaining the idle state on the one or more USB ports, wherein the PMC controller is in an always on domain of the USB host controller;
   the PMC sub-circuit further to initiate or detect a wakeup event on one of the one or more USB ports, to retrieve the one or more operating parameters of the one or more USB ports in response to the wakeup event, to wakeup the main controller circuit in response to the wakeup event, to produce a predetermined sequence of events based on the one or more operating parameters on the one or more USB ports while the main controller circuit is waking up; and the main controller circuit further to resume communication on the one of the one or more USB ports after the predetermined sequence of events produced by the PMC sub-circuit.

10. The USB host controller of claim 9, further comprising a Power Management Unit (PMU) controlled by the PMC sub-circuit to place the main controller circuit in the low energy state by turning off power to one or more clocks of the main controller circuit.

11. The USB host controller of claim 10, further comprising a clock gating circuit controlled by the PMU to place the main controller circuit in the low energy state by gating or turning off one or more supply potentials of the main controller circuit.

12. The USB host controller of claim 9, further comprising the PMU controlled by the PMC sub-circuit to wakeup the main controller circuit by turning power on to the one or more clocks of the main controller circuit.

13. The USB host controller of claim 12, further comprising a clock gating circuit controlled by the PMU to wakeup the main controller circuit by turning on the one or more supply potentials of the main controller circuit.

* * * * *